Feb. 14, 1967    J. A. TOTH ETAL    3,304,139
MOUNTING FOR MULTIPLE-ROW ROLLER BEARINGS
Filed June 22, 1964    3 Sheets-Sheet 1

INVENTORS
JOHN A. TOTH &
STUART A. HANSEN

BY Mason, Porter, Miller & Steward
ATTORNEYS

Feb. 14, 1967     J. A. TOTH ETAL     3,304,139
MOUNTING FOR MULTIPLE-ROW ROLLER BEARINGS
Filed June 22, 1964     3 Sheets-Sheet 2
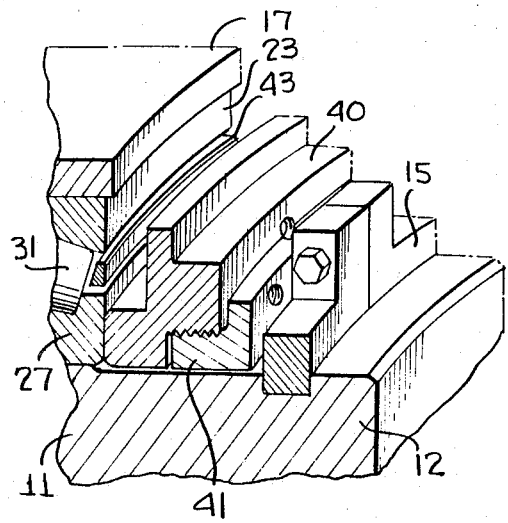
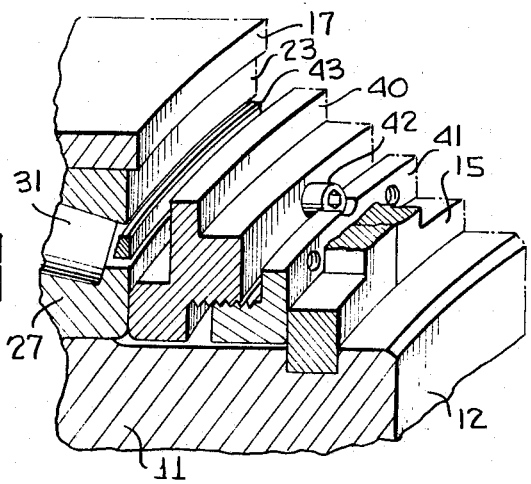
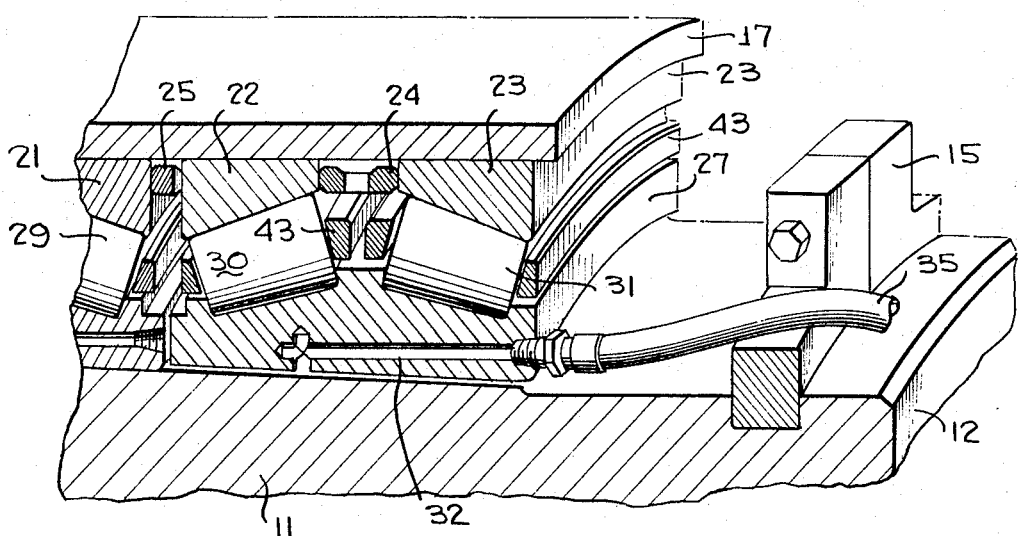
INVENTORS
JOHN A. TOTH &
STUART A. HANSEN
BY *Mason, Porter, Miller & Stewart*
ATTORNEYS Feb. 14, 1967  J. A. TOTH ETAL  3,304,139
MOUNTING FOR MULTIPLE-ROW ROLLER BEARINGS
Filed June 22, 1964  3 Sheets-Sheet 3
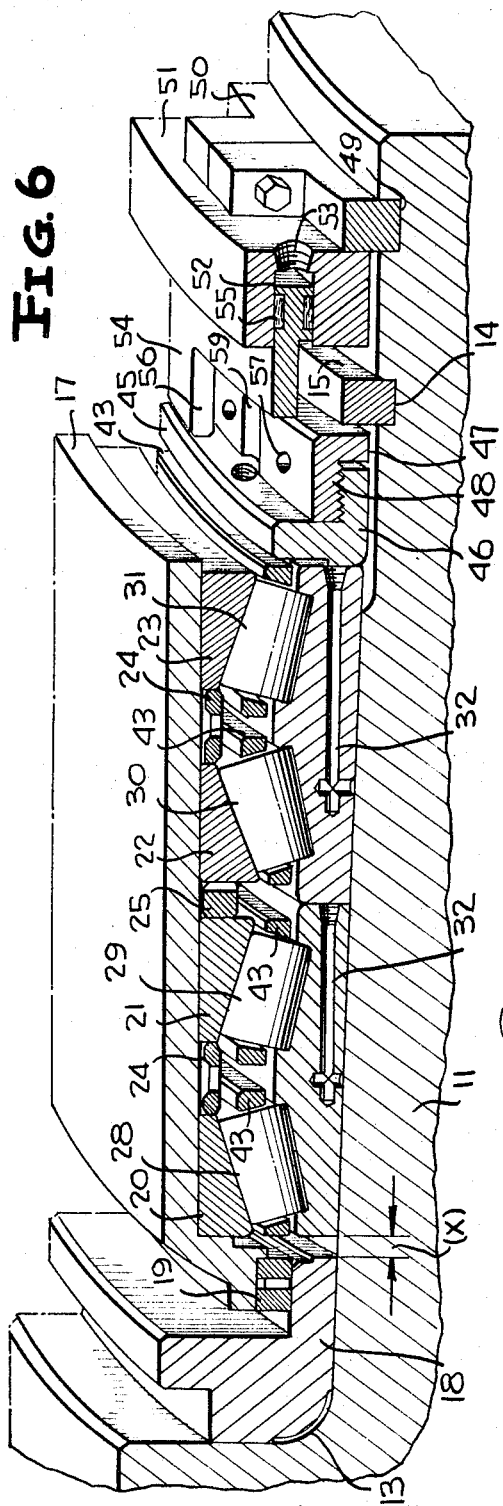
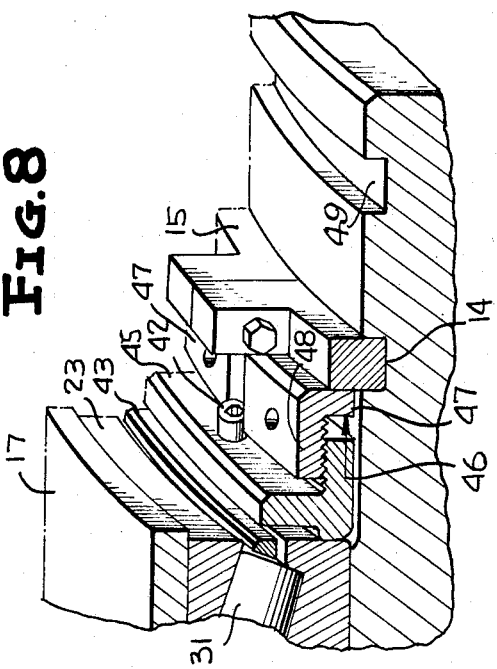
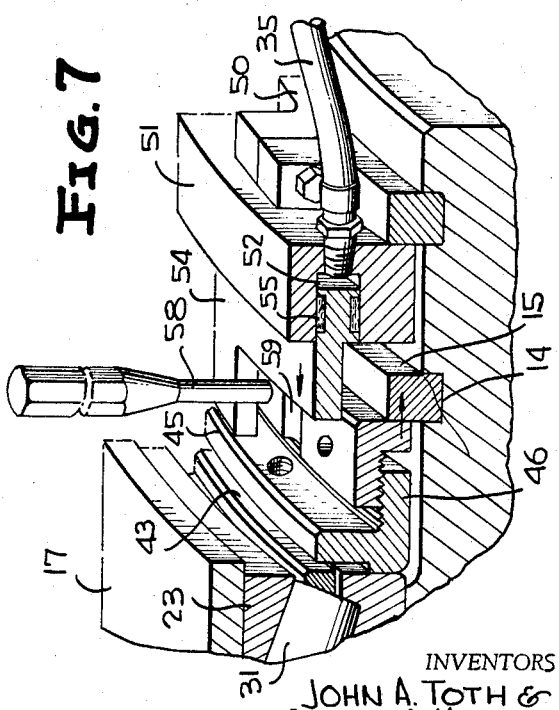
INVENTORS
JOHN A. TOTH &
STUART A. HANSEN
BY Mason, Porter, Miller & Stewart
ATTORNEYS

United States Patent Office 3,304,139
Patented Feb. 14, 1967

3,304,139
MOUNTING FOR MULTIPLE-ROW
ROLLER BEARINGS
John A. Toth and Stuart A. Hansen, South Bend, Ind.,
assignors to The Torrington Company, Torrington,
Conn., a corporation of Maine
Filed June 22, 1964, Ser. No. 376,887
9 Claims. (Cl. 308—207)

The following specification relates to improvements in a multiple-row roller bearing such as is installed on the neck of a tapered mill-roll.

The necks of mill rolls have a slight taper which makes difficult the mounting and removal of the roller bearing assemblies. One problem is the fact that the bearings are set with difficulty into the operating positions in view of the tendency of the inner race members of the bearings to slide toward the end of the mill-roll neck before means can be provided to hold the bearings tightly in the operating positions.

However, once installed it is equally difficult to dislodge the bearings from the necks or to cause them to break free from engagement with the latter.

The problem is further complicated by the condition of the roll necks whether dry or containing residual oil.

One of the objects of our invention is to provide a mounting for a multiple-row roller bearing which can be forcibly installed in operating position.

A further object of the invention is to prevent the installed bearings from slipping toward the end of the neck.

A still further object of the invention is to provide for ready removal or breaking away of each individual bearing unit without damage either to the bearing itself or to the mill roll.

These and other objects of the invention will be evident from the following description of the preferred form of the invention as illustrated on the accompanying drawings in which:

FIGURE 3 is a similar view with bearing members in final position and locking parts in place;

FIGURE 4 is a similar view with bearing members in final position and locking parts in clamping position;

FIGURE 5 is a similar view of bearing parts during removal;

FIGURE 6 is a similar view of bearing members fitted on a shaft with compressing means holding locking members during installation;

FIGURE 7 is a similar view of the same with the locking means in final position; and FIGURE 8 is a similar view of the same with the compression means removed.

Figure 1:
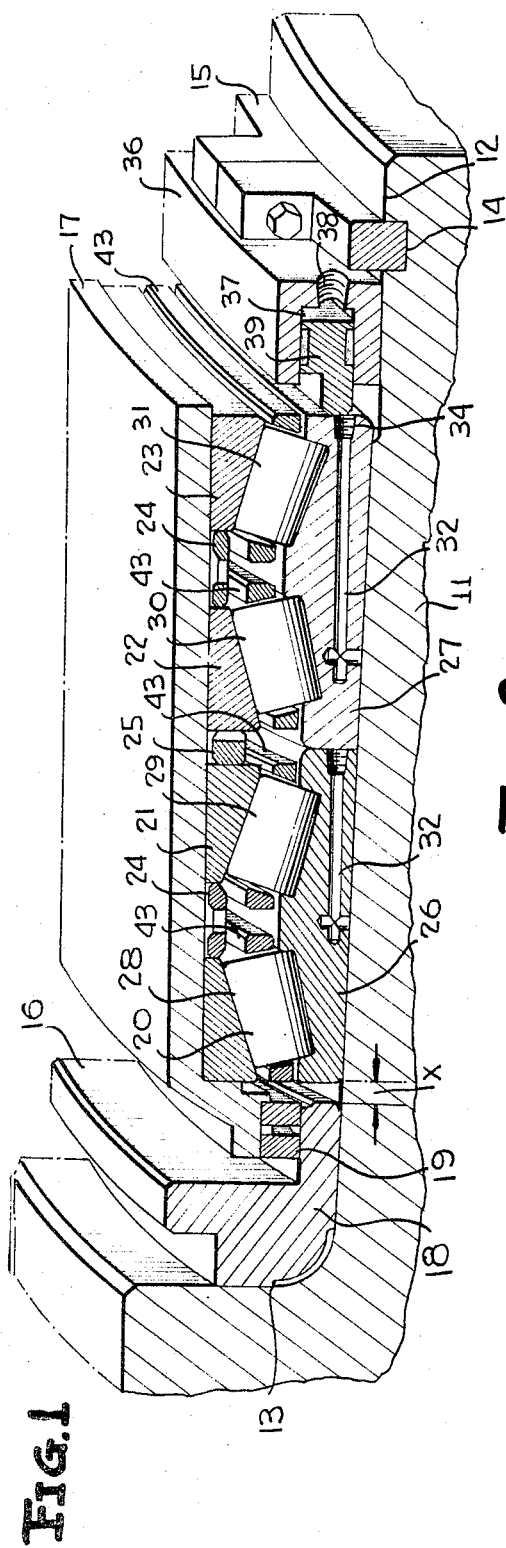
FIGURE 1 is a perspective view partly in vertical section of parts ready for final installation.

In brief, the mill-roll neck is provided temporarily with a hydraulic ram which will force the roller bearings into the final fixed positions where they can be held by means of an expanded lock nut. In some instances it will be found desirable also to maintain this force against the bearing units during the final locking of them into the operating position.

The invention also comprises suitable arrangements by which the roller units can be removed hydraulically from their attachment to the mill-roll neck.

Referring to the form shown in FIGURES 1 to 5 inclusive the mill-roll 11 has the customary tapered neck 12. The inner end of this neck has a curved shoulder 13.

The outer end of the neck 12 has a circumferential groove 14. This receives a hinged stop ring 15. The ring 15 serves as an abutment by which pressure is applied in the installation of the bearing. Conversely, the ring 15 also serves as an abutment or stop to check the inner race members of the bearings in the operation of removal. This snubs the inner race members and prevents their movement too far along the neck 12.

The inner end of the neck 12 has a backing ring or fillet 16 which rests firmly against the shoulder 13.

A bearing housing 17 is disposed around the mill neck and spaced therefrom to receive the roller bearing assembly. The backing ring 16 has a narrow flange or ledge 18. This is cylindrical and forms a support for the housing 17. The housing is separated from the flange 18 by seal rings 19, 19.

The housing 17 holds a series of four outer race members 20, 21, 22 and 23. These are alternately inclined or tapered to form suitable parts for tapered roller bearings.

The race members 20 and 21 are separated by a spacer ring 24. A similar spacer 24 separates the outer race members 22 and 23.

A central spacer ring 25 holds the intermediate race members 21 and 22 apart.

Opposite the outer race members are two inner race members 26 and 27. The race member 26 is opposite the outer race members 20 and 21. The inner race member 26 has inclined raceways depressed in the upper surface. The raceways are opposite the outer race members 20 and 21.

A series of conical rollers is fitted in the depressed raceways on the inner race member 26 opposite the outer race member 20. In like manner, a series of conical rollers 29 lie in the depressed raceway opposite the outer race member 21.

A third series of conical rollers 30 are fitted within the depressed raceway of the inner race member 27 opposite the outer race member 22. The inner race member 27 also carries its series of conical rollers 31 in a depressed raceway opposite the outer race member 23.

Spacers 43, 43 or cages fit around each series of rollers 28, 29, 30 and 31 in the customary manner.

Each inner race member 26 and 27 is drilled longitudinally to provide passageways 32. These passageways at their inner ends are connected to the interior bore of the race members by cross boring.

The outer ends of the tubes 32 are screw-threaded as at 34 or otherwise provided to receive the coupling on a tube 35 by which a supply of hydraulic pressure, oil or air is delivered.

In installing the roller bearing assembly as above described, it will be found impossible to fit the inner races 26 against the flange 16. There will be necessarily a clearance as indicated by x on FIGURE 1.

Figure 2:
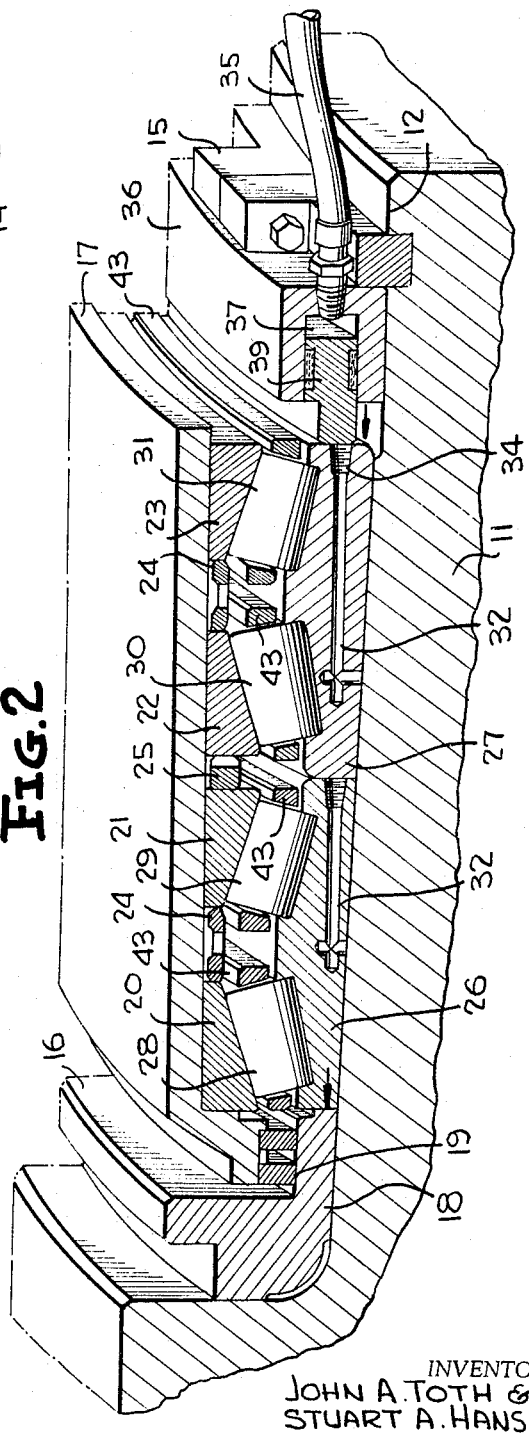
FIGURE 2 is a similar view with bearing members in final position.

In order to force the inner race members 26 and 27 to the extreme inner position as shown in FIGURE 2, a hydraulic jack 36 is provided. With the stop ring 15 removed, the jack 36 is slipped over the reduced cylindrical end of the neck 12. The stop ring 15 is then inserted in the groove and bolted into position as shown in FIGURE 1.

The jack 36 is in the form of a collar having a conventional side channel 37. There is a screw-threaded opening 38 into this channel from the outer side. This will receive the coupling of the pressure tube 35 as shown in FIGURE 2.

The channel 37 is a piston chamber in which the ram 39 slides. This ram is in the form of a ring with inner and outer packing so that it will be a close fit.

The application of fluid pressure through the pipe 35 serves to bring the hydraulic jack back against the stop ring 15. Further pressure causes the ram 39 to travel out into contact with the end of the inner race ring 27. Pressure is therefore applied directly on the race ring 27 and indirectly upon the race ring 26. Both race rings are thus driven into final position tightly engaging the tapered surface of the mill roll.

It will be readily understood that in the course of this movement the tapered bearing rollers will also cause the outer race members 20, 21, 22 and 23 to move to the left, carrying the housing 17. The structure slides over the flange 18 by reason of the sealing rings 19.

In normal conditions where the tapered neck 12 is dry, the inner race members 26 and 27 remain fixed on the roll neck. This permits the removal of the hinged stop ring 15 and also the removal of the hydraulic jack 36.

A locking spacer ring 40 is then slipped over the cylindrical neck 12. A locking nut 41 is secrewed into the spacer ring 40. The stop ring 15 is then replaced and forms a stop or abutment for the nut 41. Reverse rotation of the nut 41 relative to the spacer ring 40 fills up the space between the stop ring 15 and the inner race member 27 (FIGURE 3). After the locking nut has been brought to a firm engagement with the stop ring 15, a stud 42 in the outer side of the spacer ring 40 is fastened through a notch in the nut 41. This prevents lateral displacement of the ring 40 and the nut 41.

The removal of the tapered roller bearings is readily effected. The stud 42 is removed and the nut 41 screwed into the spacer ring 40 to relieve pressure against the stop ring 15. The ring 15 is then removed and permits removal of the spacer ring 40 and nut 41.

The application of fluid pressure through the pipe 35 and its coupling to the tube 32 will force the inner race member 27 away from the tapered roll neck 11, as shown in FIGURE 5.

This permits ready removal of the inner race member 27 and the two series of rollers 30 and 31 with the adjacent outer race members 22 and 23.

Application of fluid pressure to the tube 32 in the inner race member 26, causes the same separation of the inner race member 26 from the neck 11. As soon as the inner race member 26 is loose, it may be withdrawn. In this movement the housing 17 may also be removed, or drawing the housing 17 will likewise remove the race inner ring 26 and associated bearings.

Where residual oil is present or if the neck 11 is dry or the inner bearing members 26 and 27, it may be desirable to provide additional means to hold the members in operative position while they are being put under tension or locked.

For this purpose, the inner locking spacer ring 45 that rests against the end of the inner bearing member 27 is provided with an inner rim 46. This is externally screw-threaded.

A locking nut 47 has an outer rim 48. This is internally screw-threaded to fit the rim 46.

The ring 45 and the locking nut 47 are slipped over the neck 12 and the hinged stop ring 15 locked in place in the groove 14.

A second groove 49 spaced beyond the groove 14 carries a hinged abutment ring 50.

Before the ring 50 is installed, a hydraulic jack 51 is placed on the neck 12 between the grooves 14 and 49. This hydraulic jack is similar to the jack 36. It has a circumferential channel 52 with a screw-threaded opening 53.

A ring ram 54 is slidably fitted within the channel 52. The ring has a packing 55.

The ram overlies the ring 15 and is cut away to allow space for the ends of the latter.

The front edge of the ram rests against the side wall of the spacer ring 45, except at one point where the ram is cut away at 56 to provide access to the locknut 47. The locknut is drilled to provide spaced holes 57. By means of a pin 58 or other suitable tool, the nut 47 can be unscrewed partially from the rim 46.

When hydraulic pressure is applied to the channel 52, the ram 54 is driven against the spacer ring 45. This in turn drives the inner bearing member 27 and indirectly the inner bearing 26 tightly so that the clearance $x$ between the member 26 and the shoulder 18 no longer exists.

With the pressure of ram 54 still acting, the locking ring 47 is then partially unscrewed until it abuts firmly against the ring 15. A groove 59 in the ring 47 is then brought in line with a screw-threaded opening in the side wall of the ring 45. A stud 42 in the opening will then maintain the adjusted positions of the ring 45 and locknut 47 fully occupying the space between the inner member 27 and the ring 15.

The pressure in the channel 52 may then be released and the abutment ring 50 free for removal. The ring 51 and ram 54 are both removed, leaving the ring 15, ring 45 and locknut 47 under tension to hold the inner members 26 and 27 in operative position (FIGURE 8).

In this assembly, locking nut 47 may be screwed up to provide slack between the inner member 27 and the ring 15. The latter may then be removed together with the ring 45 and the locking nut 47.

The hinged ring 15 may then be returned to the groove 14 to serve as an abutment in the removal of the inner bearing members (FIGURE 5).

The inner members 27–26 are then successively broken away from attachment to the neck 11 as shown in FIGURE 5.

The invention has been illustrated and described in its preferred form for purposes of illustration, but without limitation, however, other than the scope of the accompanying claims.

What we claim is:

1. A multiple-row roller bearing comprising two adjacent race members each having two oppositely inclined race-ways, a series of tapered rollers in each race-way, an outer housing, an individual outer race member in the housing opposite each series of rollers, each said race member being spaced apart from an adjacent race member, and means for holding said race members together.

2. A shaft mounting for a multiple-row roller bearing comprising a tapered shaft, a fillet for the shaft, two adjacent race members to fit the shaft, each race member having two oppositely inclined race-ways, a series of tapered rollers in each race-way, an outer housing, an individual outer race member in the housing opposite each series of rollers, each said race member being spaced apart from an adjacent race member, and means on the shaft for holding the race members together and against said fillet.

3. A shaft mounting for a multiple-row roller bearing comprising a tapered shaft, a fillet for the shaft, two adjacent inner race members to fit the shaft, each race member having two oppositely inclined race-ways, a series of tapered rollers in each race-way, a flange on the fillet, an outer housing slidable on the flange, an individual outer race member in the housing opposite each series of rollers, each said race member being spaced apart from an adjacent race member, a stop ring on the end of the shaft and compression means between the ring and the nearer race member for forcing the inner race members against the fillet.

4. A shaft mounting for a multiple-row roller bearing comprising a tapered shaft, a fillet for the shaft, two adjacent inner race members to fit the shaft, each race member having two oppositely inclined race-ways, a series of tapered rollers in each race-way, a flange on the fillet, an outer housing slidable on the flange, an individual outer race member in the housing opposite each series of rollers, a stop ring on the end of the shaft and a fluid operated jack between the ring and the nearer race member for forcing the inner race members against the fillet.

5. A shaft mounting for a multiple-row roller bearing comprising a tapered shaft, a fillet for the shaft, two adjacent inner race members to fit the shaft, each race member having two oppositely inclined race-ways, a series of tapered rollers in each race-way, a flange on the fillet, an outer housing slidable on the flange, an individual outer race member in the housing opposite each series of rollers, a stop ring on the end of the shaft and tension means between the ring and the nearer race member for holding the inner race members against the fillet.

6. A shaft mounting for a multiple-row roller bearing comprising a tapered shaft, a fillet for the shaft, two adjacent inner race members to fit the shaft, each race member having two oppositely inclined race-ways, a series of tapered rollers in each race-way, a flange on the fillet, an outer housing slidable on the flange, an individual outer race member in the housing opposite each series of rollers, a stop ring on the end of the shaft and an adjustable spacer ring and nut between the stop ring and the inner race member for holding the inner race members against the fillet.

7. A shaft mounting for a multiple-row roller bearing comprising a tapered shaft, a fillet for the shaft, two adjacent inner race members to fit the shaft, each race member having oppositely inclined race-ways, a series of tapered rollers in each race-way, an outer housing, an individual outer race member in the housing opposite each series of rollers, an inner stop ring on the end of the shaft, an adjustable spacer ring and nut between the ring and the nearer race member for holding the inner race members against the fillet, an outer stop ring on the end of the shaft and compression means between the spacer ring and the outer stop ring and over the nut and inner stop ring.

8. The method of mounting a multiple-row roller bearing on a tapered shaft which consists of fitting two inner race members and complementary outer race members and series of rollers over the shaft, placing a spacer ring and nut on the shaft adjacent the nearer inner race member, placing a fluid pressure compression means on the shaft outside of the nut, placing a stop ring outside of the compression means, applying compression between said spacer ring and said stop ring, and unscrewing the nut to provide pressure against the stop ring.

9. The method of mounting a multiple-row roller bearing on a tapered shaft which consists of fitting two inner race members and complementary outer race members and series of rollers over the shaft, placing a spacer ring and nut on the shaft adjacent the nearer inner race member, placing a stop ring outside of the nut, placing a fluid pressure compression means on the shaft outside of the said stop ring, placing a second outer stop ring on the shaft beyond the compression means, applying compression between the spacer ring and the last named stop ring and unscrewing the nut to provide pressure against the first named stop ring.

References Cited by the Examiner

UNITED STATES PATENTS

| | | | |
|---|---|---|---|
| 2,003,339 | 6/1935 | Buckwalter | 308—180 |
| 2,939,750 | 6/1960 | Weckstein | 308—23.6 |

FOREIGN PATENTS

| | | |
|---|---|---|
| 838,693 | 12/1938 | France. |

MARTIN P. SCHWADRON, *Primary Examiner.*

FRANK SUSKO, *Examiner.*